United States Patent [19]

Dudek et al.

[11] Patent Number: 5,568,169
[45] Date of Patent: Oct. 22, 1996

[54] METHOD AND APPARATUS USING TWO DIFFERENT BLACK INKS TO REDUCE INTERCOLOR BLEEDING AND PROVIDE HIGH QUALITY EDGE DEFINITION WITH THERMAL INK JET SYSTEMS

[75] Inventors: Lesley P. Dudek, Webster, N.Y.; Vaughan L. Dewar, Bartlett, Tenn.; Michael C. Ferringer; Peter A. Torpey, both of Webster, N.Y.

[73] Assignee: Xerox Corporation, Stamford, Conn.

[21] Appl. No.: 325,016

[22] Filed: Oct. 19, 1994

[51] Int. Cl.⁶ .................... B41J 2/21; B41J 2/205
[52] U.S. Cl. .................... 347/43; 347/15
[58] Field of Search .................... 347/43, 15, 100, 347/40

[56] References Cited

U.S. PATENT DOCUMENTS

| | | |
|---|---|---|
| 4,748,453 | 5/1988 | Lin et al. . |
| 4,967,203 | 10/1990 | Doan et al. . |
| 5,371,531 | 12/1994 | Rezanka et al. ............ 347/43 |
| 5,428,377 | 6/1995 | Stoffel et al. ............ 347/15 |
| 5,455,610 | 10/1995 | Harrington ............ 347/43 |

Primary Examiner—Benjamin R. Fuller
Assistant Examiner—Thinh Nguyen
Attorney, Agent, or Firm—Oliff & Berridge

[57] ABSTRACT

A color ink jet printing device capable of substantially reduced intercolor bleeding includes an ink jet printer having at least one printhead and at least three separate ink supplies in communication with the printhead. A first ink supply contains a slow drying black ink. A second ink supply contains a fast drying black ink. A third ink supply contains a fast drying non-black color ink. Prior to printing, black image potions are determined. The black portions are printed using a pixel priming process, a border substitution process or a combination thereof to reduce intercolor bleed. The pixel priming process first prints a quartertone or halftone pattern using fast drying black ink, followed by subsequent whole tone printing superposed on the primed black image area using a slow drying black ink. The border substitution process analyzes a neighboring matrix of pixels surrounding each black pixel, preferably at least a 5×5 matrix, to determine if color pixels other than black are present. If so, that black pixel is printed using the fast drying black ink to reduce intercolor bleed. Otherwise, the black pixel is printed using slow drying black ink. This printing may be further improved by checkerboarding the black image portions. This involves printing a partial tone checkerboard pattern in a first pass and printing a complementary checkerboard pattern on a second pass to provide a whole tone of the image portions.

19 Claims, 11 Drawing Sheets

| FAST AND SLOW DRY INKS | SLOW DRY BLACK ONLY | FAST AND SLOW DRY INKS | SLOW DRY BLACK ONLY | FAST AND SLOW DRY INKS |
|---|---|---|---|---|
| SLOW DRY BLACK ONLY | FAST AND SLOW DRY INKS | SLOW DRY BLACK ONLY | FAST AND SLOW DRY INKS | SLOW DRY BLACK ONLY |
| FAST AND SLOW DRY INKS | SLOW DRY BLACK ONLY | FAST AND SLOW DRY INKS | SLOW DRY BLACK ONLY | FAST AND SLOW DRY INKS |
| SLOW DRY BLACK ONLY | FAST AND SLOW DRY INKS | SLOW DRY BLACK ONLY | FAST AND SLOW DRY INKS | SLOW DRY BLACK ONLY |
| FAST AND SLOW DRY INKS | SLOW DRY BLACK ONLY | FAST AND SLOW DRY INKS | SLOW DRY BLACK ONLY | FAST AND SLOW DRY INKS |

| FAST DRY INK | | FAST DRY INK | | FAST DRY INK |
|---|---|---|---|---|
| | FAST DRY INK | | FAST DRY INK | |
| FAST DRY INK | | FAST DRY INK | | FAST DRY INK |
| | FAST DRY INK | | FAST DRY INK | |
| FAST DRY INK | | FAST DRY INK | | FAST DRY INK |

FIG.3

| FAST AND SLOW DRY INKS | SLOW DRY BLACK ONLY | FAST AND SLOW DRY INKS | SLOW DRY BLACK ONLY | FAST AND SLOW DRY INKS |
|---|---|---|---|---|
| SLOW DRY BLACK ONLY | FAST AND SLOW DRY INKS | SLOW DRY BLACK ONLY | FAST AND SLOW DRY INKS | SLOW DRY BLACK ONLY |
| FAST AND SLOW DRY INKS | SLOW DRY BLACK ONLY | FAST AND SLOW DRY INKS | SLOW DRY BLACK ONLY | FAST AND SLOW DRY INKS |
| SLOW DRY BLACK ONLY | FAST AND SLOW DRY INKS | SLOW DRY BLACK ONLY | FAST AND SLOW DRY INKS | SLOW DRY BLACK ONLY |
| FAST AND SLOW DRY INKS | SLOW DRY BLACK ONLY | FAST AND SLOW DRY INKS | SLOW DRY BLACK ONLY | FAST AND SLOW DRY INKS |

FIG.4

| NO OTHER COLOR | NO OTHER COLOR | NO OTHER COLOR |
|---|---|---|
| NO OTHER COLOR | CURRENT BLACK PIXEL POSITION NO SUBSTITUTION REQUIRED | NO OTHER COLOR |
| NO OTHER COLOR | NO OTHER COLOR | NO OTHER COLOR |

FIG. 5

| * CYAN PIXEL * | NO OTHER COLOR | NO OTHER COLOR |
|---|---|---|
| NO OTHER COLOR | CURRENT BLACK PIXEL POSITION REQUIRING FAST DRY SUBSTITUTION | NO OTHER COLOR |
| NO OTHER COLOR | NO OTHER COLOR | NO OTHER COLOR |

FIG. 6

| * * CYAN PIXEL * * | NO OTHER COLOR | NO OTHER COLOR | NO OTHER COLOR | NO OTHER COLOR |
|---|---|---|---|---|
| NO OTHER COLOR | NO OTHER COLOR | NO OTHER COLOR | NO OTHER COLOR | NO OTHER COLOR |
| NO OTHER COLOR | NO OTHER COLOR | CURRENT BLACK PIXEL POSITION REQUIRING FAST DRY SUBSTITUTION | NO OTHER COLOR | NO OTHER COLOR |
| NO OTHER COLOR | NO OTHER COLOR | NO OTHER COLOR | NO OTHER COLOR | NO OTHER COLOR |
| NO OTHER COLOR | NO OTHER COLOR | NO OTHER COLOR | NO OTHER COLOR | NO OTHER COLOR |

| COLOR PIXELS | COLOR PIXELS | COLOR PIXELS | COLOR PIXELS | COLOR PIXELS | COLOR PIXELS | COLOR PIXELS |
|---|---|---|---|---|---|---|
| COLOR PIXELS | FAST DRY BLACK BORDER | FAST DRY BLACK BORDER | FAST DRY BLACK BORDER | FAST DRY BLACK BORDER | FAST DRY BLACK BORDER | COLOR PIXELS |
| COLOR PIXELS | FAST DRY BLACK BORDER | FAST AND SLOW DRY INKS | SLOW DRY BLACK ONLY | FAST AND SLOW DRY INKS | FAST DRY BLACK BORDER | COLOR PIXELS |
| COLOR PIXELS | FAST DRY BLACK BORDER | SLOW DRY BLACK ONLY | FAST AND SLOW DRY INKS | SLOW DRY BLACK ONLY | FAST DRY BLACK BORDER | COLOR PIXELS |
| COLOR PIXELS | FAST DRY BLACK BORDER | FAST AND SLOW DRY INKS | SLOW DRY BLACK ONLY | FAST AND SLOW DRY INKS | FAST DRY BLACK BORDER | COLOR PIXELS |
| COLOR PIXELS | FAST DRY BLACK BORDER | FAST DRY BLACK BORDER | FAST DRY BLACK BORDER | FAST DRY BLACK BORDER | FAST DRY BLACK BORDER | COLOR PIXELS |
| COLOR PIXELS | COLOR PIXELS | COLOR PIXELS | COLOR PIXELS | COLOR PIXELS | COLOR PIXELS | COLOR PIXELS |

FIG.9

 * NO PRIMING AND NO BORDER PRINT EXAMPLE: *
SLOW DRY BLACK ADJACENT TO FAST DRY YELLOW

 * BORDER SUBSTITUTION EXAMPLE: *
1 PIXEL WIDE BORDER OF FAST DRY BLACK PLACED BETWEEN SLOW DRY BLACK AND FAST DRY YELLOW WHICH IS ADJACENT TO THE BLACK AREA.

 * PRIMER PIXELING ONLY EXAMPLE: *
FAST DRY PRIMER PIXELS PRINTED 1ST (UNDERNEATH) THE SLOW DRY BLACK AREA IN A HALFTONE PATTERN.
FAST DRY YELLOW ADJACENT TO THE BLACK AREA.

 * PRIMER PIXELING WITH A 1 PIXEL WIDE BORDER EXAMPLE: *
FAST DRY PRIMER PIXELS PRINTED 1ST (UNDERNEATH) THE SLOW DRY BLACK AREA IN A HALFTONE PATTERN.
1 PIXEL WIDE BORDER OF FAST DRY INK ONLY BETWEEN ANY BLACK AREA AND YELLOW.
FAST DRY YELLOW ADJACENT TO THE BLACK AREA.

FIG.12

METHOD AND APPARATUS USING TWO DIFFERENT BLACK INKS TO REDUCE INTERCOLOR BLEEDING AND PROVIDE HIGH QUALITY EDGE DEFINITION WITH THERMAL INK JET SYSTEMS

BACKGROUND OF THE INVENTION

1. Field of the Invention

The present invention relates to an ink jet system and method of use that reduces intercolor bleeding of composite color images and provides sharp black portions using two different black inks having different drying rates and definition qualities.

2. Description of Related Art

In traditional four-ink color ink jet printing (black, cyan, magenta and yellow), a major objective has been to achieve high edge definition for black-only areas, such as text, and also low intercolor bleed for color graphics. Currently, this is achieved through use of specially coated papers, thermally assisted drying of the ink or long wait times between ink passes.

Slow drying black inks generally provide high edge definition, but bleed into colors when their borders touch. Current faster drying inks have lesser bleed, but generally give lower edge definition on black text and line-art. On plain paper, there is currently no solution that gives good edge quality and eliminates intercolor bleed.

A previous attempt at reducing ink flowing between adjacent pixel areas is described in U.S. Pat. No. 4,748,453 to Lin et al., assigned to the same assignee as this invention. Lin et al. provides a checkerboard printing process that prints an alternating checkerboard pixel pattern in one pass wherein only diagonally adjacent pixel areas are deposited with ink. On a second pass the complementary checkerboard pattern is deposited to provide a complete image. Both passes are printed using the same ink.

An attempt at reducing intercolor bleed can be found in pending U.S. Ser. No. 07/927,983, assigned to the same assignee as this invention. Intercolor bleeding is reduced by examining each black pixel and a surrounding matrix of pixels of an image and determining if the pixel is bordering a color area. If so, this pixel is preferably colored using process color black (a combination of fast drying cyan, yellow and magenta inks). This reduces intercolor bleed at border areas. If the black pixels are not border pixels, that is they are part of text or in the middle of a black image, they are printed using a slow drying black ink having good picture quality because bleeding is not of a concern here.

In an optional embodiment, two differing black inks are utilized and border pixels are printed using a faster drying black ink and non-border pixels are printed using a slow drying black ink with higher picture quality.

Another attempt at reducing intercolor bleed can be found in related U.S. Ser. No. 08/176381, assigned to the same assignee as this invention. Intercolor bleed is reduced by using a slow drying black ink and fast drying CYM inks in a partial tone printing method that prints a portion of the black image and all of one of the CYM colors in a first pass and prints the remainder of the black image along with the other colors in subsequent passes.

All of these prior methods have shortcomings. While some intercolor bleed reductions are obtained, greater reductions in intercolor bleed and better edge definition are desired.

OBJECTS AND SUMMARY OF THE INVENTION

It is an object of the present invention to provide an ink jet system and method of use that reduces intercolor bleeding of composite color images by using two different black inks having different drying rates and definition qualities.

The above and other objects are achieved according to a first aspect of the invention by a color printing device for producing a composite color image having reduced intercolor bleeding comprising: liquid ink spot producing means for depositing color ink in at least three colors, the colors including a slow drying black ink, a fast drying black ink and at least one non-black color ink; determining means for determining black portions of an image; and control means for depositing a partial tone of the black portions of the image using the fast drying black ink and subsequently depositing a whole tone of the black portions of the image superposed on the partial tone using the slow drying black ink.

This objective is further achieved by the preceding device further comprising:

digital imaging means for producing and storing a digital representation of the color image to be reproduced;

analyzing means for analyzing each black pixel of the digital color image and a surrounding matrix of neighboring pixels surrounding each said black pixel;

determining means within the analyzing means for determining for each black pixel if any of the neighboring pixels contain colors other than black and white; and control means for reproducing the black pixels of the color image onto a recording substrate, the control means printing each one of the black pixels according to predetermined criteria. The criteria includes printing a black pixel using slow drying black ink if none of the surrounding matrix of neighboring pixels for the black pixel were determined to contain colors other than black and white and printing the black pixel using fast drying black ink if one or more of the surrounding matrix of neighboring pixels for the black pixel were determined to contain colors other than black and white.

Even further reductions of intercolor bleed and image quality can be achieved by additionally combining a checkerboarding technique for printing partial tones of the black image portions in separate passes.

These and other objects will become apparent from a reading of the following detailed description in connection with the drawings.

BRIEF DESCRIPTION OF THE DRAWINGS

The invention will be described in detail with reference to the following drawings wherein:

FIG. 3 shows a first step of a pixel priming process wherein a halftone fast drying black ink priming layer is printed on a black image portion according to one aspect of the invention;

FIG. 4 shows the example of FIG. 3 after subsequently printing a whole tone slow drying black ink layer on top of the priming layer;

FIG. 5 shows a 3×3 pixel matrix exemplifying a one-pixel wide border substitution process according to another aspect of the invention, this matrix showing no immediate neighboring pixels of a color other than black or white (such as cyan, magenta or yellow or combinations thereof);

FIG. 6 shows a 3×3 pixel matrix exemplifying a border substitution process as in FIG. 5 showing an immediate neighboring pixel having a cyan pixel requiring the central black pixel to be substituted during printing with a fast drying black ink;

FIG. 7 shows a 5×5 pixel matrix exemplifying a two-pixel wide border substitution process according to another aspect of the invention, this matrix showing a cyan neighboring pixel within the testing matrix requiring substitution of the black central pixel during printing with fast drying black ink;

FIG. 8 shows a black image portion according to another aspect of the invention being printed using a two pass checkerboarding process;

FIG. 9 shows a composite color image printed with the combined pixel priming and border substitution processes;

FIG. 12 shows print samples using double-pass printing and various priming methods.

DETAILED DESCRIPTION OF PREFERRED EMBODIMENTS

Figure 1:
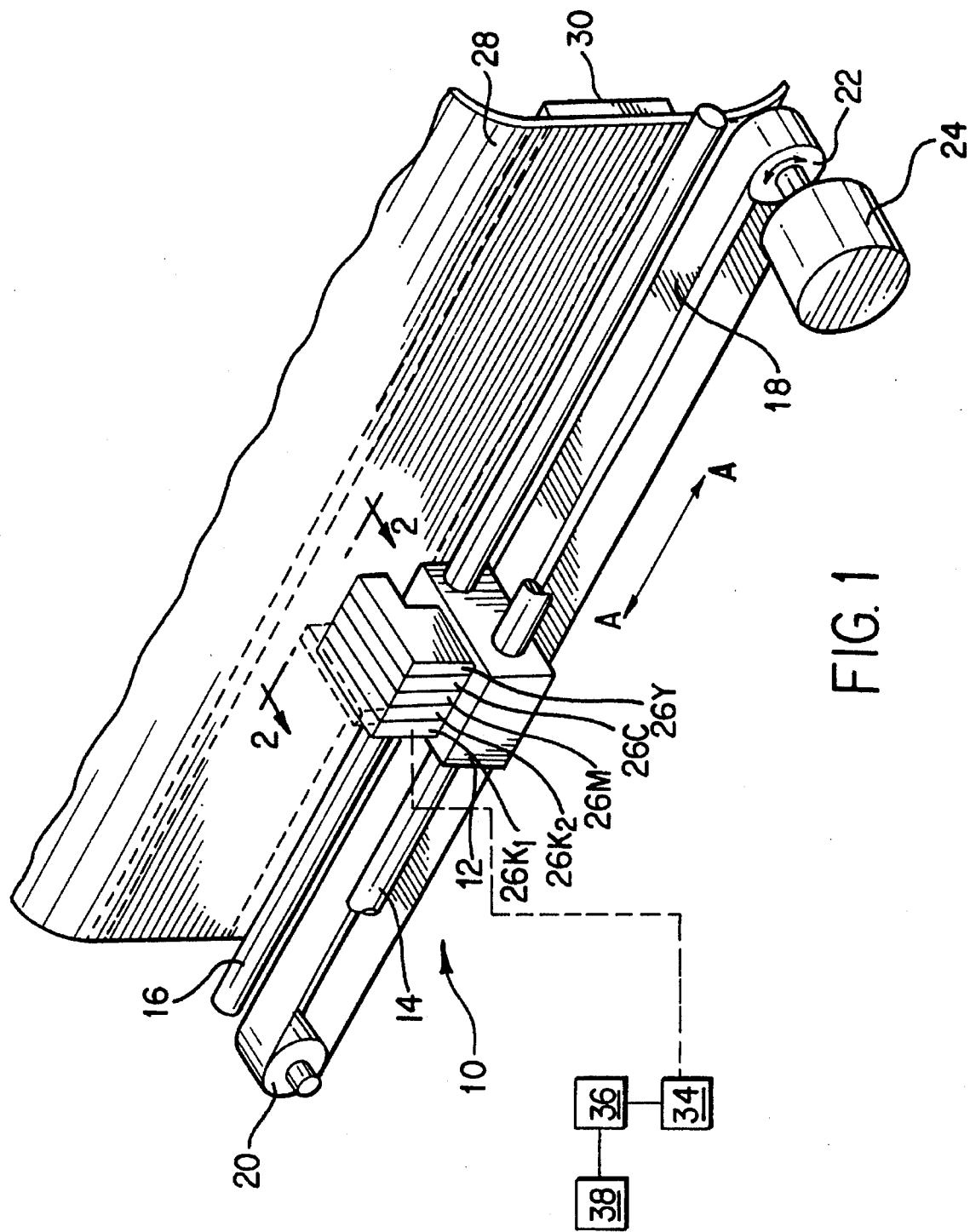
FIG. 1 is a perspective view illustrating a preferred five-color, multi-head, scanning type ink jet printer used in the invention.

FIG. 1 shows a preferred five-color printing mechanism 10 including a carriage 12 mounted for reciprocation in the directions of arrow A—A on guide rails 14 and 16 secured to a frame (not shown) of the printer. The carriage is driven along the guide rails by a suitable mechanism such as a drive belt 18 supported between idler pulley 20 and drive pulley 22, and driven by motor 24.

In order to make a composite, multi-color image, recording heads 26Y, 26C, 26M, $26K_1$ and $26K_2$ (delivering yellow, cyan, magenta, slow drying black and fast drying black inks, respectively) are mounted in respective cartridge holders provided on the carriage 12. Each cartridge holder includes appropriate mechanical, electrical and fluid couplings so that selected ink drivers can be activated in response to a suitable driving signal from a controller 34 to expel ink from the cartridges onto a recording substrate 28 supported upon a platen 30.

Controller 34, which may be a microprocessor or computer, receives signals representing a color composite image from an image generator 38. Image generators are well known in the art. Examples of a suitable image generator 38 are a scanner or digitizer that scans data from a color original and generates signals in a predetermined color space representing color readings or a computer and associated software and/or user interfaces that generate digital image signals in a predetermined color space. There are many accepted standards of color space format such as RGB, CYMK, CIELAB, CIELUV and others. Preferably, the generator 38 outputs signals in CYMK color space. Alternatively, controller 34 may be capable of converting from any accepted standard output from the generator 38 to CYMK color space. Conversion from one color space to another is conventional and well known.

Signals from generator 38 are preferably stored at least temporarily in a buffer memory 36. Memory 36 can be a RAM or ROM. Controller 34 analyzes each black pixel that makes up black image portions of the color image and is capable of modifying the signals stored in memory 36 from CYM K signals to 5-color CYM $K_1K_2$ signals used by printing mechanism 10 to print the color image on a recording substrate. The novel invention allows use of plain paper as a recording substrate while providing good image quality and reduced intercolor bleeding.

Figure 2:
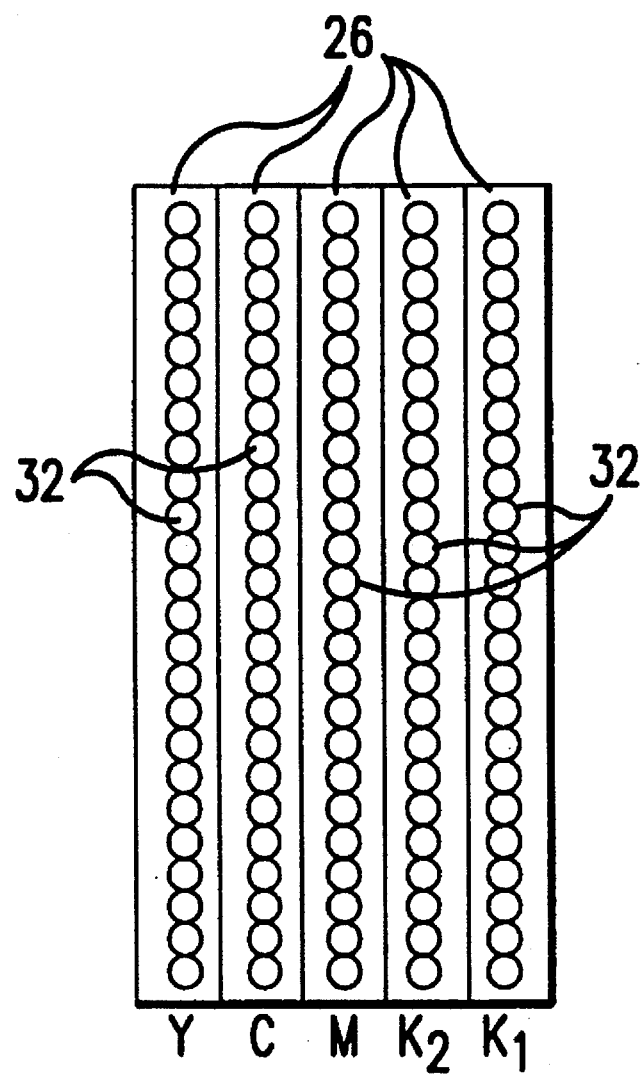
FIG. 2 is a view taken along line 2—2 of FIG. 1, illustrating the nozzle arrays of the five-color ink jet recording head assembly.
Figure 10A:
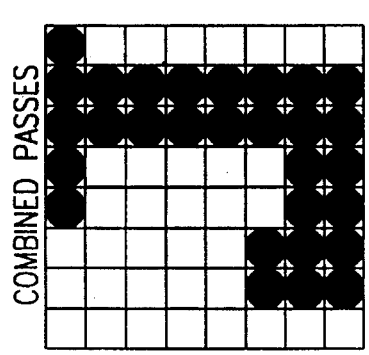
FIGS. 10a–c show an exemplary two pass checkerboarding image of the character 'J' according to the invention.
Figure 10B:
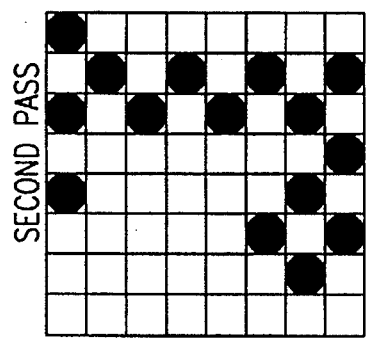
Figure 10C:
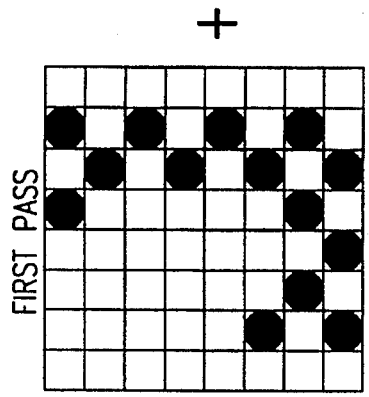

As shown in FIG. 2, each cartridge 26 is provided with an array of aligned nozzles 32. The nozzles can be of any size and spacing depending on the desired resolution of the printing device. For example, if a resolution of 300 spots per inch is preferred, each nozzle would be approximately 2 mil in diameter and would be spaced on about 3.3 mil centers. While the preferred embodiments are described with respect to a printhead 26 that traverses across a platen in a processing direction and a recording substrate such as paper that is incrementally advanced transverse to the processing direction, the invention is equally suited to a full width printing array in which the array is stationary and prints a full line width at a time. In such a printing device, the recording substrate is incrementally advanced across the array.

While this invention preferably utilizes a five ink printing system ($CYMK_1K_2$) where C is a cyan fast drying ink, Y is a yellow fast drying ink, M is a magenta fast drying ink, $K_1$ is a slow drying, high image quality black ink having high bleed characteristics and $K_2$ is a fast drying, lower image quality black ink having lower bleed characteristics, the invention can be practiced and beneficial in any printing system having fast drying and slow drying black ink and at least one other non-black color ink. It should also be understood that while the invention is preferably directed to a thermal ink jet printing system, generally the invention is applicable to other liquid ink spot printing systems.

A pixel priming process of printing black portions of a color composite image using the two black inks according to a first aspect of the invention reduces intercolor bleed by priming black pixels prior to printing with the $K_1$ ink. This pixel priming process preferably involves the sequence of first printing a quarter tone or halftone type of pattern with the fast dry ink K2, although this priming can comprise any percentage of coverage up to and including 100%, and subsequently printing a whole tone of the slow drying black ink $K_1$ superposed over the primed fast drying quartertone or halftone pattern.

This is accomplished by modifying the signals sent to the printheads 26 by controller 34. Instead of sending a signal to print only one of the black inks on any given pixel, the controller distinguishes black image portions and modifies the signals for these portions to provide a priming undercoat layer to be printed for these portions prior to the final top layer of ink. The printing can be performed on a same pass or on separate passes. The color portions of the image can be printed in either of the passes or in multiple subsequent passes.

Figure 11:
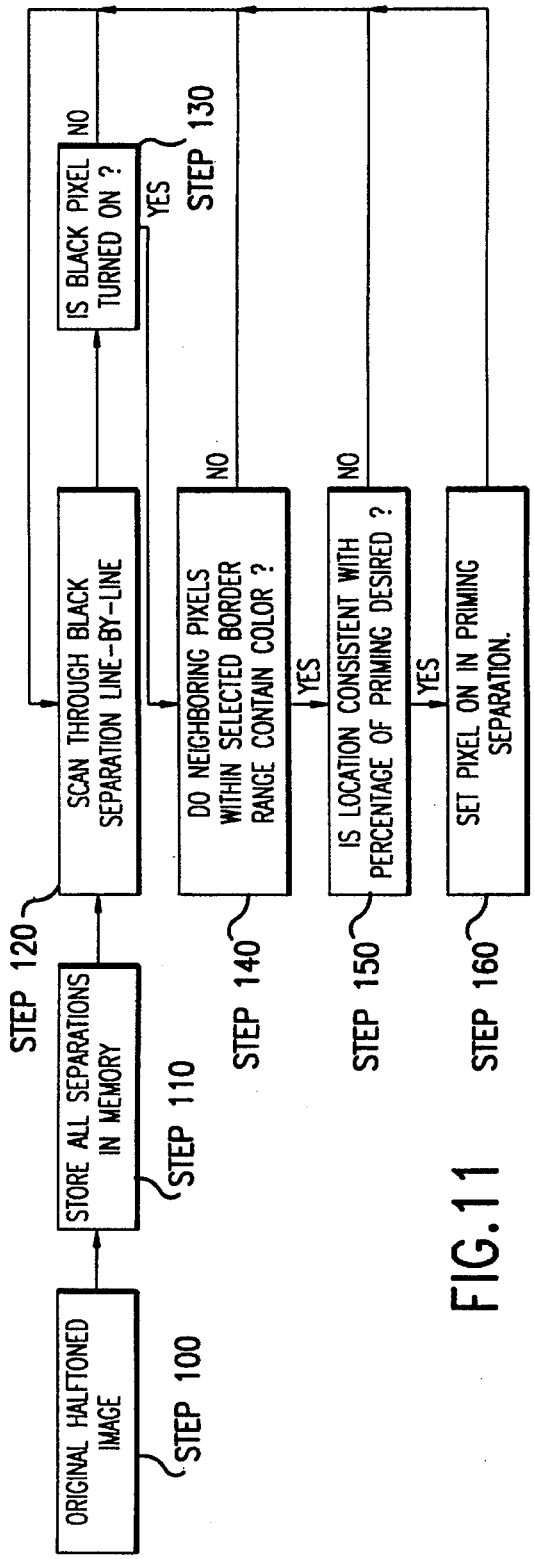
FIG. 11 shows an algorithm flow chart for determination of priming pixels according to the invention.

FIG. 11 shows a flow chart of an algorithm used to determine the primer layer coverage. An original halftone image (step 100) is stored in memory (step 110). Then, the controller 34 scans through each black separation line-by-line (step 120) checking for black pixels. If the current scanned pixel is determined not to be black (step 130), operation returns to step 120 and a next pixel is scanned. If the current scanned pixel is determined to be black, operation advances to step 140 where neighboring pixels are examined. If no neighboring pixels contain color (non-black), operation returns to step 120. Otherwise, operation advances to step 150. Step 150 determines if the pixel location is consistent with a percentage of priming desired. If it is, operation is advanced to step 160, which sets the scanned pixel on in a priming separation. If not, operation returns to step 120. This algorithm continues through each pixel of the image.

Single pass operation can be achieved by using two side-by-side printheads, one for each of the two black inks, such as that shown in FIGS. 1 and 2. The leading printhead in a processing direction of the printing prints the fast drying ink while a trailing printhead subsequently prints the slow drying ink. Multiple pass operation is achieved by using one or more printheads with the fast drying ink being printed on a first pass and the slow drying ink being printed on a subsequent pass. Alternatively, if the printer is bi-directional, the fast drying black ink can be printed in a positive processing direction pass and the slow drying black ink can be printed in a subsequent reversal direction.

FIG. 3 shows a 5×5 pixel matrix representing a black image portion after printing the priming layer using a preferred half tone (checkerboard) pattern of fast drying black ink. FIG. 4 shows the same 5×5 matrix after a slow drying black ink whole tone pattern is subsequently printed over the priming layer. Notice that alternating pixels have a fast drying priming layer and every pixel has a slow drying black ink layer, with the slow drying black ink being super posed on top of the fast drying layer on the alternating pixels.

According to another aspect of the invention, the previous process can be further improved by additionally incorporating a border substituting method to black image portions. A digital image is processed, through examination of signals stored in memory 36, to determine which areas of black have no neighboring colors making contact. Those isolated areas, such as text or central areas within a black image portion, are printed using the slow dry ink to obtain the highest picture quality. This is because intercolor bleed is not critical in these areas. Black areas that do have contact with colors (border pixels) are substituted with fast drying black ink. Alternatively, process color black (a combination of cyan, yellow and magenta) fast dry ink can be substituted for fast dry black in these areas.

The width of the border substitution may preferably be 1–4 pixels or more as needed. An example of a one pixel wide border substitution on a bit mapped four color image is shown in FIGS. 5 and 6. Each pixel location is checked to determine if it has black in it. If so, its eight immediate neighboring pixels (surrounding the pixel above, below, to the sides and diagonally) are checked for content of any non-black color, such as cyan, yellow or magenta. If no neighboring pixels have color (FIG. 5), the black pixel is printed using slow drying black ink. If there is a neighboring color (FIG. 6), then the fast drying black ink prints the black pixel.

If a two pixel wide substitution border is used, the same process occurs but 24 neighbors surrounding the black pixel are checked for color content. This is shown as a 5×5 matrix in FIG. 7. Larger border substitutions follow the same procedure but simply check a larger number of neighboring pixels for color content. Preferably, at least two or more pixel widths are substituted to adequately reduce intercolor bleed. Depending on constraints based on desired picture edge definition, image quality, processing capabilities or time constraints (larger border width examination requires increased processing time and computing capabilities), a suitable border substitution width can be selected.

After each black pixel of the image has been analyzed and its best representation determined and selected, the image is printed. Black areas are primed in a first pass using the fast drying black ink using a partial tone such as a halftone or quartertone. Then, the slow drying black ink is subsequently applied in another pass. All black areas are primed and border pixels are printed using the fast drying ink to reduce intercolor bleed. Black non-border areas are printed using the slow drying black ink superposed on the previously applied partial tone priming layer to improve image sharpness and quality.

Figure 8:
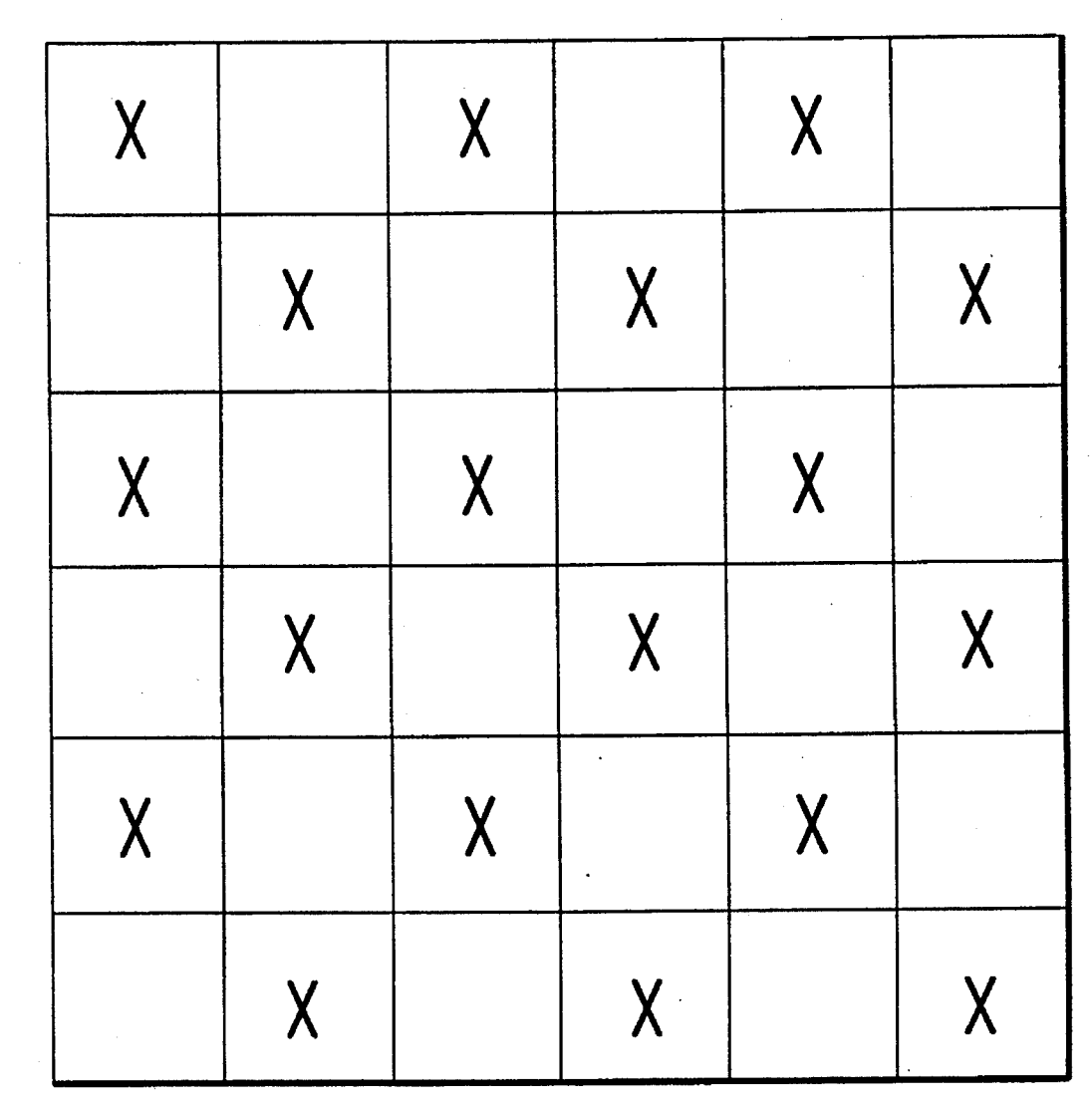

According to another aspect of the invention, the primer pixeling and border substitution processes can be combined with pixel checkerboarding to further reduce intercolor bleed and improve color quality. This requires two passes over each image area. The first pass prints only every other pixel and the second pass fills in the remaining pixels. That is, each consecutive horizontal line alternates between odd and even fill patterns. See FIG. 8. A more detailed description of this basic process can be found in U.S. Pat. No. 4,748,453, the disclosure of which is incorporated herein by reference in its entirety. This checkerboarding when used in conjunction with pixel priming and/or border substitution allows better drying for black because this "scanned" arrangement reduces bulk ink effects such as ink puddling and mottle. A short time delay before printing the second pass allows the first pass to briefly dry. This checkerboarding is especially beneficial when applying the slow drying black ink layer which is most susceptible to intercolor bleeding.

FIG. 9 represents a 7×7 matrix of a composite color image as printed according to preferred processes of the invention. In this example, the outermost perimeter of pixels contains color pixels and is printed using appropriate color fast drying inks, such as cyan, magenta or yellow. The innermost 5×5 matrix of pixels represents a black image portion and is printed using the combination of primer pixeling and border substitution. Of these, the innermost 3×3 matrix represents a non-border black area and is printed using a halftone priming layer of fast drying black ink and a whole tone layer of slow drying black ink superposed over the fast drying primer layer. The outermost perimeter pixels of the inner 5×5 matrix are border pixels, that is they have adjoining or neighboring color pixels and are susceptible to intercolor bleed with these neighboring pixels. These border pixels are printed using the fast drying black ink to reduce intercolor bleed.

Figure 13:
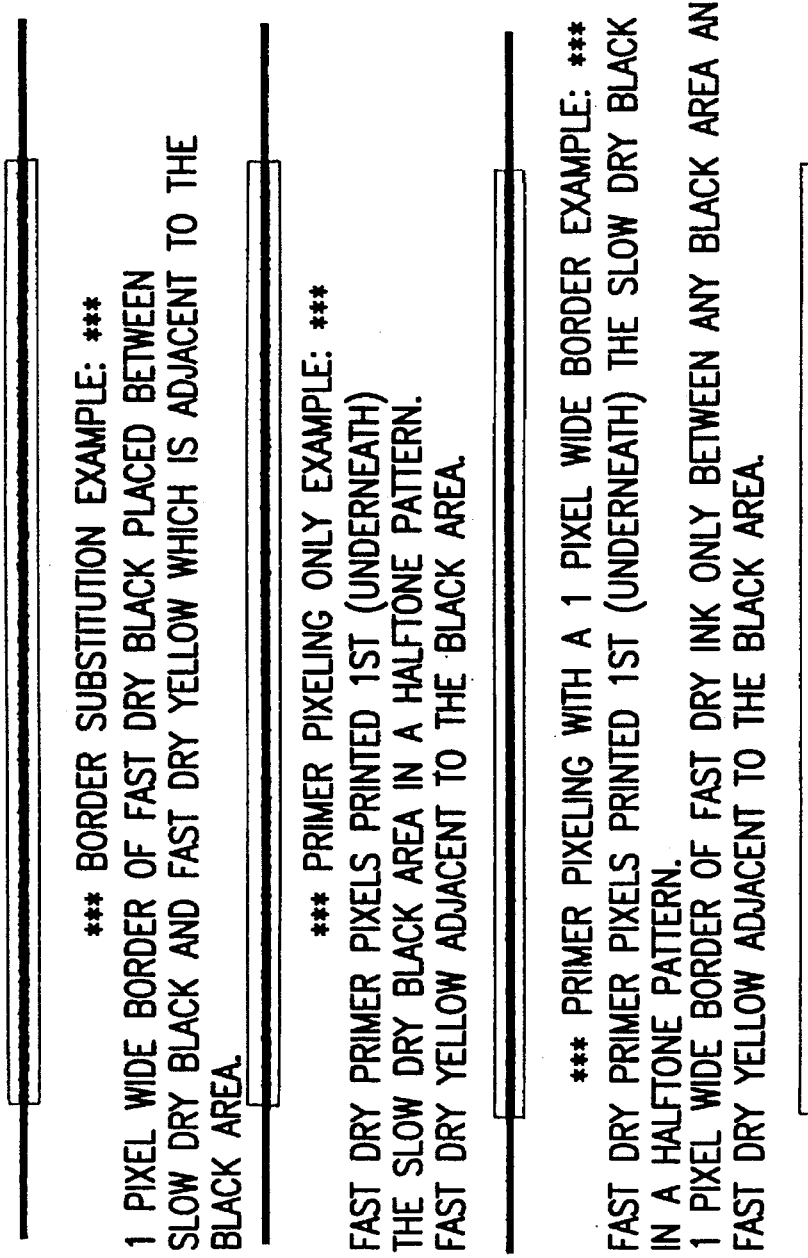
FIG. 13 shows print samples using checkerboard printing and various priming methods.

Samples of the various aspects of the invention were tested using a Xerox Mod. 635 thermal ink jet printer and Xerox Image Series plain paper. Black and white reproductions of the actual color samples are shown in FIGS. 12–13. While this system is typically a four color (CYMK) printer, it was modified by replacing one of the fast drying CYM colors with the fast drying ink $K_2$ and the K used slow drying ink $K_1$. A slow drying ink is one which typically has a surface tension greater than 45 dynes/cm and which requires more than 1 second to absorb completely into a plain-paper substrate. A fast drying ink is one which typically has a surface tension less than 45 dynes/cm and which require less than 0.2 seconds to absorb completely into a plain-paper substrate. These definitions only apply for normal cellulosic, uncoated "plain" paper. Also, as these definitions indicate, drying rate is largely dependent on the surface tension of the ink. Inks used in the samples follow these definitions.

Test samples of composite images were printed utilizing: (1) conventional printing with no priming or border; (2)

border substitution (one pixel wide); (3) pixel priming; and (4) a combination of border substitution (one pixel wide) and pixel priming. The above processes were performed on one sample page in a double pass mode in which all priming and slow drying black inks were printed in a first pass and border pixels and yellow ink printed in a second pass and on a second sample page in a checkerboard mode in which all inks were printed in checkerboard fashion as previously described in two passes. The test image consisted of a 12 pixel wide black line with fast drying yellow ink placed immediately above and below the black line. Because of the pixel priming, the black/color border shows significantly improved edge sharpness and reduced intercolor excursions, especially where the slow-dry black ink was printed in the checkerboard mode. Further, non-border areas still provide superior print quality because of the use of slow drying black ink in these areas.

FIG. 12 (first line) demonstrates typical slow-dry/fast-dry ink intercolor bleed using normal printing. FIG. 12 (second line) demonstrates use of border substitution and shows significant reduction of intercolor bleed as evidenced by reduced excursion of black into yellow area. FIG. 12 (third line) demonstrates use of pixel priming and shows dramatic reduction of intercolor bleed. Severe "feathers" of excursion into the yellow area are nearly absent although "blooming" of the black line at the yellow interface is evident. FIG. 12 (fourth line) demonstrates use of border substitution and pixel priming and shows additional improvement over. Bloom is reduced and black/yellow edges appear sharper.

FIG. 13 (first line) demonstrates use of two-pass checkerboarding and shows slightly reduced raggedness. FIG. 13 (second line) demonstrates use of checkerboarding with border substitution and shows significant reduction of intercolor bleed. FIG. 13 (third line) demonstrates use of checkerboarding with pixel priming and shows further reduction of intercolor bleed. FIG. 13 (fourth line) demonstrates use of checkerboarding, border substitution and pixel priming and shows excellent print quality with virtually no intercolor bleed and only slight bloom.

The invention has been described with reference to the preferred embodiments thereof, which are illustrative and not limiting. Various changes may be made without departing from the spirit and scope of the invention as defined in the appended claims.

What is claimed is:

1. A color ink jet printing device for producing reduced intercolor bleeding of inks comprising:

an ink jet printer including at least one printhead for printing a color image onto a recording medium;

at least three separate ink supplies in communication with said at least one printhead, a first supply containing a slow drying black ink, a second supply containing a fast drying black ink and a third supply containing a fast drying non-black color ink;

determining means communicating with the ink jet printer for determining black portions of the color image to be printed on the recording medium; and control means for driving the ink jet printer to deposit on select black a partial tone, using said fast drying black ink and subsequently deposit a whole tone superposed on said partial tone using said slow drying black ink.

2. The color printer of claim 1, wherein said control means deposits said partial tone in one pass in a processing direction and deposits said whole tone in a subsequent pass in said processing direction.

3. The color printer of claim 1, wherein said at least one printhead bi-directionally traverses across a platen of the ink jet printer and said control means deposits said partial tone in one pass in a forward processing direction and deposits said whole tone in a subsequent reverse processing direction.

4. The color printer of claim 1, wherein said at least one printhead is a full width printhead.

5. A color printing device for producing a composite color image having reduced intercolor bleeding comprising:

liquid ink spot producing means for depositing color ink in at least three colors, said colors including a slow drying black ink, a fast drying black ink and at least one non-black color ink;

determining means communicating with the liquid ink spot producing means for determining black portions of the image; and control means for driving the liquid ink spot producing means to print on select black portion a partial tone using said fast drying black ink and subsequently print a whole tone superposed on said partial tone using said slow drying black ink.

6. The color printing device of claim 5, wherein said control means deposits said partial tone in a range of a quartertone to a halftone checkerboard pattern on select black image portion using said fast drying black ink.

7. The color printing device of claim 5, further comprising:

digital imaging means for producing and storing a digital representation of the color image to be reproduced;

analyzing means for analyzing each black pixel of the digital color image and a surrounding matrix of neighboring pixels surrounding said each black pixel;

determining means within said analyzing means for determining for each black pixel if any of said neighboring pixels contain colors other than black and white; and said control means reproduces said black pixels of said color image onto the recording medium, said control means printing each one of said black pixels according to predetermined criteria, said criteria including printing said one black pixel using slow drying black ink if none of the surrounding matrix of neighboring pixels for said one black pixel were determined to contain colors other than black and white and printing said one black pixel using fast drying black ink if one or more of the surrounding matrix of neighboring pixels for said one black pixel were determined to contain colors other than black and white.

8. The color printing device of claim 7, wherein said surrounding matrix is from 1 to 4 pixels wide defining a pixel matrix of between 3×3 and 9×9.

9. The color printing device of claim 8 wherein said surrounding matrix is at least a 5×5 matrix.

10. A digital printing method for printing a color ink image using two black inks having differing drying rates and at least one other color ink, comprising the steps of:

receiving input signals representing pixels that make up a color image of a predetermined resolution;

storing said input signals in a buffer memory;

examining said input signals to determine black image portions of the color image;

examining each pixel within said black image portions along with a surrounding matrix of pixels neighboring each said pixel;

determining for each pixel within said black image portions whether any of the surrounding matrix of pixels contains colors other than black and white;

designating an optimum representation of each black pixel of said black image portion according to said determining step, said designating step designating one of first and second black inks for each black pixel; and printing the color image onto a recording medium, said step of printing including printing on select black image portions a partial tone pattern select using said first black ink having a first drying rate to create a primed layer and subsequently printing a whole tone pattern using said second black ink superposed over the primed layer, the second black ink having a slower drying rate than the first black ink.

11. The method of claim 10, wherein the second black ink is applied in a halftone checkerboard pattern having alternating white and black pixels printed in a first pass and a complementary halftone checkerboard pattern printed in a subsequent pass.

12. The method of claim 10, wherein said surrounding pixel matrix being examined has dimensions between 3×3 and 9×9.

13. The method of claim 10, wherein said partial tone printing step prints a halftone of the black image portion.

14. The method of claim 10, wherein said partial tone printing step prints a quartertone of the black image portion.

15. The method of claim 10, wherein said surrounding pixel matrix being examined is at least a 5×5 matrix.

16. A digital printing method for printing a color ink image using two black inks having differing drying rates and at least one other color ink, comprising the steps of:

receiving input signals representing pixels that make up a color image of a predetermined resolution;

storing said input signals in a buffer memory;

examining said input signals to determine black image portions of the color image; and printing the color image onto a recording medium, said step of printing including printing on select black image portions a partial tone pattern using a first black ink having a first drying rate providing a primed layer, subsequently printing a half tone pattern using a second black ink, the second black ink having a slower drying rate than the first black ink, and subsequently printing a complementary half tone pattern using the second black ink.

17. The color printer of claim 1, wherein said select black portions include all black portions.

18. The color printer of claim 5, wherein said select black portions include all black portions.

19. The method of claim 10, wherein said step of printing primes all of the black image portions with the partial tone pattern using the first ink.

* * * * *